United States Patent [19]

Sato

[11] Patent Number: 5,238,111

[45] Date of Patent: Aug. 24, 1993

[54] MAGNETIC TAPE CASSETTE CASE

[75] Inventor: Makoto Sato, Kanagawa, Japan

[73] Assignee: Fuji Photo Film Co., Ltd., Kanagawa, Japan

[21] Appl. No.: 981,305

[22] Filed: Nov. 25, 1992

[30] Foreign Application Priority Data

Nov. 27, 1991 [JP] Japan .............................. 3-104653[U]

[51] Int. Cl.$^5$ .......................................... B65D 85/575
[52] U.S. Cl. .................................. 206/387; 229/195
[58] Field of Search ............... 206/387, 491; 229/190, 229/195

[56] References Cited

U.S. PATENT DOCUMENTS

| | | | |
|---|---|---|---|
| 4,445,612 | 5/1984 | Shepherd | 206/387 |
| 4,445,634 | 5/1984 | Sato | 206/387 |
| 4,520,927 | 6/1985 | Sato | 206/387 |
| 4,545,483 | 10/1985 | Shiba et al. | 206/387 |
| 4,555,021 | 11/1985 | Fujii | 206/387 |
| 4,688,673 | 8/1987 | Yabe | 206/387 |

Primary Examiner—Jimmy G. Foster
Attorney, Agent, or Firm—Sughrue, Mion, Zinn, Macpeak & Seas

[57] ABSTRACT

A magnetic tape cassette case in the form of a rectangular box which can be produced with excellent productivity and which is free from the difficulty that the magnetic tape cassette can easily fall out of the cassette under its own weight. The upper wall has outer flaps extending from its right and left edges, which the lower wall has inner flaps extending from its right and left edges. The inner flaps have rear end portions which are offset from a folding line between the lower wall and the rear wall towards the opening of the case, and have cuts substantially at the middle which extend towards the opening of the case. The rear wall has small flaps extending from its right and left edges. With the outer flaps bonded to the outer surfaces of the inner flaps, the base end portion of each of the small flaps is located inwardly of the case, while the front end portion is held between the inner and outer flaps extending through the cut, and the rear end portions of the inner flaps protrude inwardly of the case.

8 Claims, 2 Drawing Sheets

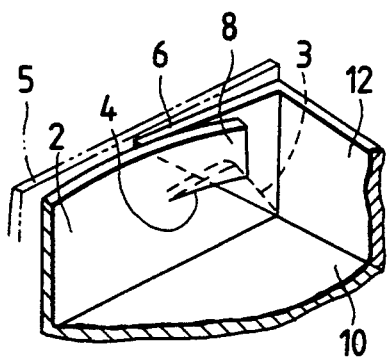
FIG. 3
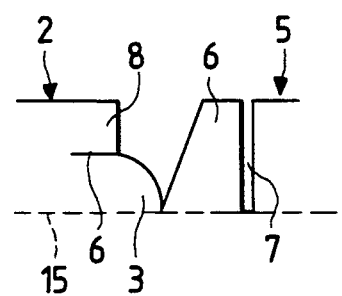
FIG. 4
FIG. 5
PRIOR ART
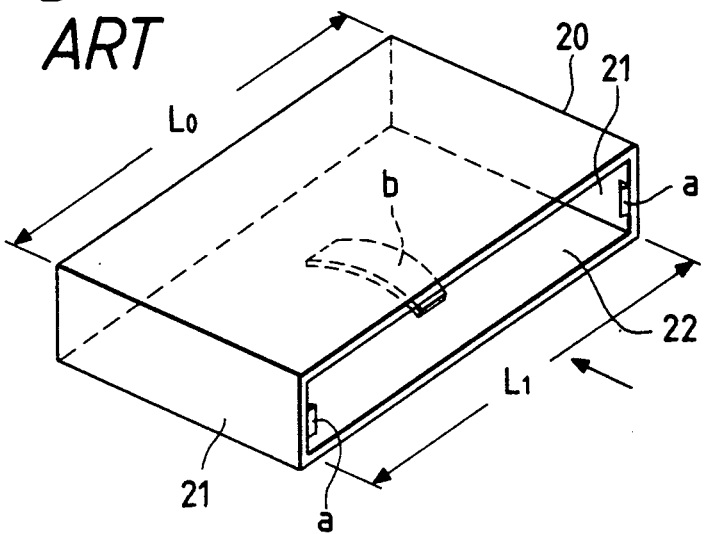

MAGNETIC TAPE CASSETTE CASE

BACKGROUND OF THE INVENTION

The present invention relates to an improved case for a magnetic tape cassette case, and more particularly to the structure of a magnetic tape cassette case of a type which covers five walls of a magnetic tape cassette.

Recently, video tape recorders, 8-mm video cameras, computers, and word processors have been extensively used. In this connection, magnetic tape cassettes or magnetic disk o cassettes are employed as data recording media for such devices. Magnetic tape cassettes are preferably placed in cassette cases when stored. Some cassette cases are designed so that two halves of the case can be opened and closed in a hinged manner. On the other hand, rectangular-box-shaped cases are employed for certain magnetic tape cassettes, for example, those intended for use in VHS-type video cameras, Beta-type video cameras, and 8-mm video cameras due to their simple construction and convenience in use.

As is well known in the art, a cassette case is used not only for purposes of merely storing and conveniently stacking magnetic tape cassettes, but also for protecting the magnetic tape cassette from damage and for preventing entrance of dust, more specifically, for preventing the accumulation of dust on the magnetic tape or on the inner surface of the cassette.

As described above, one of the important functions of a magnetic tape case is to protect the magnetic tape cassette and the tape inside. In addition, it is also important that the magnetic tape cassette case be designed so that the magnetic tape cassette can be inserted into the case and removed therefrom with ease; for instance, it is important that the inner surfaces of the case be smooth so that the cassette can be easily slid in and out of the case. However, if the inner surfaces of the case are formed in this manner, when the cassette case is held so that its opening is at the bottom, and especially when the case is shaken in such a state, the magnetic tape cassette is liable to fall out of the case under its own weight, possibly damaging the cassette.

Japanese Unexamined Published Utility Model Applications Nos. 64682/1988, 111477/1988 and 111478/1988 disclose countermeasures which may be taken in response to the above-described difficulty. That is, in order to prevent the cassette from dropping from the case, as shown in FIG. 5, protrusions a or locking pieces can be formed on the inner surfaces of side walls near the edges which define opening 22 of a cassette case 20 through which the cassette is inserted and removed, more specifically, on the inner surfaces of the right and left walls 21 and 21 near their edges.

In another structure for preventing the magnetic tape cassette from dropping from the cassette case, the protrusions a are not used, and instead an elongated elastic locking piece b is employed as indicated by the phantom lines in FIG. 5. That is, the locking piece b is bonded to an inner surface of the cassette case in such a manner that it is elastically inwardly curved. In addition, the manufacturing tolerance on the width $L_1$ of the opening 22 is severe with respect to the width of the cassette ($L_1$ being smaller than the rear end dimension $L_0$ of the case).

In manufacturing a cassette case having the protrusions a or locking piece b, it is necessary to provide a manufacturing step for mounting these members. In manufacturing the above-described cassette case 20, an intermediate product, namely, a blank plate formed by blanking a plate of synthetic resin or cardboard, is folded and formed into the cassette case. However, it may be required to stack the intermediate products prior to use by stacking them one on another. It is rather difficult to do so though because the intermediate products have the protrusions a or locking pieces b. For the same reason, the intermediate products are not suitable for conveyance by an automatic feeder. That is, it is quite troublesome to handle the intermediate products, which greatly lowers the productivity of the cassette case.

SUMMARY OF THE INVENTION

Accordingly, an object of the invention is to eliminate the above-described difficulties accompanying a conventional magnetic tape cassette case in the form of a rectangular box. More specifically, an object of the invention is to provide a magnetic tape cassette case which can be produced with excellent productivity, and which is free from the difficulty that the cassette can easily dropped out of the case under its own weight.

The foregoing and other objects of the invention have been achieved by the provision of a magnetic tape cassette case in the form of a rectangular box which is composed of an upper wall, a lower wall, a rear wall through which the lower wall is connected to the upper wall, and flaps extending from the right and left sides of the upper wall and the lower wall to cover five surfaces of a magnetic tape cassette, in which, according to the invention, the upper wall has outer flaps extending from its right and left edges, the lower wall has inner flaps extending from its right and left edges, the inner flaps having rear end portions which are offset from a folding line between the lower wall and the rear wall towards the opening of the case and have cuts substantially at the middle which extend towards the opening of the case, the rear wall has small flaps extending from its right and left edges such that, with the outer flaps bonded to the outer surfaces of the inner flaps, the base end portion of each of the small flaps is located inward of the case, while the front end portion is held between the inner and outer flaps extending through the cut, and the rear end portions of the inner flaps protrude inwardly of the case.

BRIEF DESCRIPTION OF THE DRAWINGS

FIG. 3 is a perspective view showing the overlap of the inner and outer flaps of the blank plate shown in FIG. 1;

FIG. 4 is a plan view showing a part of a modification of the magnetic tape cassette case according to the invention.

FIG. 5 is a perspective view showing a conventional magnetic tape cassette case.

DESCRIPTION OF THE PREFERRED EMBODIMENTS

Preferred embodiments of the invention will be described with reference to the accompanying drawings, which show an example of a magnetic tape cassette case for a VHS-type video tape recorder, Beta-type video tape recorder, or 8-mm video tape recorder.

Figure 1:
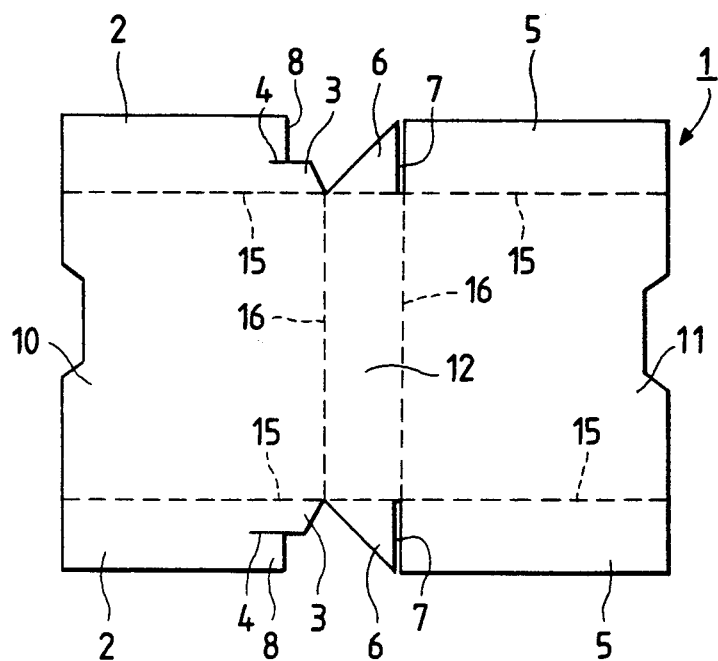
FIG. 1 is a plan view of a blank plate used to form a magnetic tape cassette case according to the invention.

FIG. 1 is a plan view of a blank plate obtained by blanking and which is to be folded to form the magnetic tape cassette case according to the invention.

The blank plate, as shown in FIG. 1, is composed of a lower wall 10, an upper wall 11, a rear wall 12 between the lower wall 10 and the upper wall 11, a pair of right and left flaps 2 extending from both sides of the lower wall 10, a pair of right and left flaps 5 extending from both sides of the upper wall 11, and a pair of right and left flaps 6 extending from both sides of the rear wall 12. The blank plate is folded along folding lines 15 and 16, and thereafter the flaps are bonded together in such a manner that they overlap one another. Thus, the desired magnetic tape cassette case in the form of a rectangular box is formed in such a manner as to covers five surfaces of the magnetic tape cassette. This will be described in more detail.

As described above, the upper wall 11 has the right and left flaps 5 (located above and below in FIG. 1), which are outer flaps, and the lower wall 10 has the right and left flaps 2 (located above and below in FIG. 1), which are inner flaps. Each of the rear end portions of the inner flaps 2 is formed with a locking portion 8 and a split portion 3 which are offset from the folding line 16 between the lower wall 10 and the rear wall towards the opening of the case. In addition, each of the inner flaps 2 has a cut 4 in the rear end portion substantially at the middle which separates the locking portion 8 and the split portion 3 from each other. The right and left flaps 6 of the rear wall 12 are substantially triangular and are spaced from the right and left flaps 5 by respective slits 7.

Figure 2:
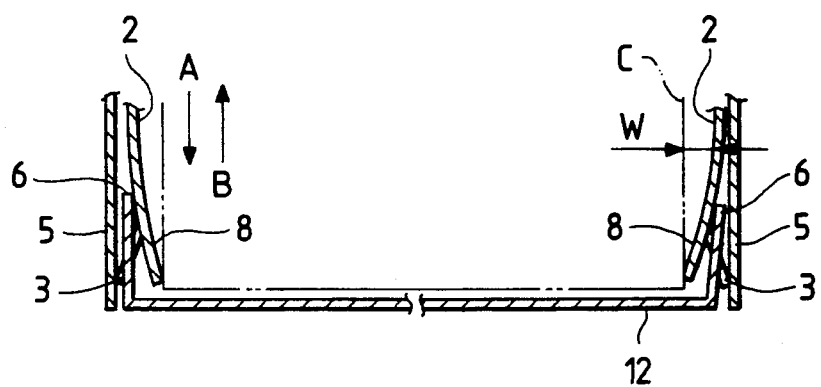
FIG. 2 is a sectional view of the cassette case of FIG. 1 showing the overlap of inner and outer flaps of the blank plate shown in FIG. 1.

When the blank plate is folded to form the cassette case 1, the outer flaps 5 come outside the inner flaps 2, and the small flaps 6 are positioned as shown in FIGS. 2 and 3. That is, the base end portion (close to the folding line 15) of each of the small flaps 6 is located further inwardly of the case than the split portion 3, and the front end portion thereof is located between the inner and outer flaps 2 and 5 extending through the cut 4, more specifically, it is located between the locking portion 8 and the outer flap 5 extending through the cut 4. Accordingly, the front end of the locking portion 8, which is part of the rear end portion of the inner flap 2, elastically protrudes by a width W inwardly of the case while being directed towards the back of the case (i.e., towards the rear wall 12).

The blank plate for fabricating the magnetic tape cassette case 1 may be made of a thermoplastic resin such as polyester, polyethylene, polypropylene, polycarbonate, or polyvinyl chloride. The thickness of the blank plate is, for instance, 0.5 to 0.8 mm, and the heating temperature is about 160° C. The flaps are bonded together with adhesive or by spot welding to complete the fabrication of the rectangular-box-shaped case.

In the cassette case 1 thus formed, the small flaps 6 are inserted into the cuts 4 of the inner flaps 2, and the locking portions 8 elastically extend inwardly of the case and towards the back of the latter. Therefore, in inserting the magnetic tape cassette C into the case 1 (in the direction of the arrow A), the locking portions 8 cause substantially no resistance; that is, the cassette C can be smoothly inserted into the case 1. On the other hand, in removing the magnetic tape cassette C from the case 1 (in the direction of the arrow B), the locking portions 8 are resistive to the removal of the cassette while frictionally engaging with the side walls of the cassette.

Furthermore, in the cassette case of the invention, each of the locking portions 8 is suitably flexible, and since the small flap 6 is engaged with the split portion 3 through the cut, the force urging the cassette inwardly of the case is maintained for a long time. That is, the locking portions 8 are able to hold the magnetic tape cassette C with a stable clamping force providing ideal pressure, thus providing excellent protection of the cassette case. In addition, in the manufacture of the cassette case of the invention, unlike that of the conventional case, it is not necessary to form the protrusions a or locking piece b on the blank plate; that is, the blank plate is one flat plate. Hence, the blank plates can be handled and conveyed with ease during manufacture.

While a preferred embodiment of the invention has been described, it should be noted that the invention is not limited thereto or thereby. For example, the configuration of the flaps or the direction of the cut 4 can be changed. For instance, as shown in FIG. 4, the split portion 3 may be modified in configuration in such a manner that it has a outwardly curved edge, or the small flap 6 may be modified so that it is trapezoidal in shape. In addition, the locking portion 8 (which is rectangular in FIG. 1 or 4) may be changed in configuration so that it has an outwardly curved edge or inclined edge (not shown).

As described above, the cassette case according to the invention is arranged so that the small flaps are inserted in the cuts of the inner flaps, and the locking portions, that is, the end portions of the inner flaps, elastically protrude inwardly of the case and towards the rear of the latter. Therefore, in inserting the magnetic tape cassette into the case, the locking portions are not resistive, and hence the cassette can be o smoothly inserted into the case. On the other hand, in removing the magnetic tape cassette from the case, the locking portions 8 are resistive to the removal of the cassette while frictionally engaging with the side walls of the cassette. Thus, the cassette case of the invention has excellent operability.

Furthermore, in the cassette case of the invention, each of the locking portions 8 is suitably flexible, and since the Small flap 6 is engaged with the split portion 3 through the cut, the force urging the cassette inwardly of the case is maintained for a long time. That is, the locking portions 8 are able to hold the magnetic tape cassette C with a stable clamping force providing ideal pressure, and provide excellent protection of the cassette case. In addition, in the manufacture of the cassette case of the invention, unlike that of the conventional case, it is unnecessary to form the protrusions a or locking piece b on the blank plate; that is, the blank plate is a single flat plate. Hence, the blank plates can be handled and conveyed with ease during manufacture.

What is claimed is:

1. In a magnetic tape cassette case in the form of a rectangular box having an upper wall, a lower wall, a rear wall through which said lower wall is connected to said upper wall, and flaps extending from right and left sides of said upper wall and said lower wall to cover five surfaces of a magnetic tape cassette, the improvement wherein:

said upper wall has outer flaps extending from right and left edges of said upper wall;

said lower wall has inner flaps extending from right and left edges of said lower wall, said inner flaps having rear end portions offset from a folding line between said lower wall and said rear wall towards an opening of said case, and cuts substantially at the middle thereof which extend towards said opening of said case;

said rear wall has small flaps extending from right and left edges thereof, wherein, with said outer flaps bonded to outer surfaces of said inner flaps, a base end portion of each of said small flaps is located inwardly of said case, while a front end portion thereof is held between said inner and outer flaps extending through said cut; and rear end portions of said inner flaps protrude inwardly of said case.

2. The magnetic tape cassette case of claim 1, wherein said small flaps of said rear wall are substantially triangular.

3. The magnetic tape cassette case of claim 1, wherein said small flaps of said rear wall are substantially trapezoidal.

4. The magnetic tape cassette case of claim 1, wherein said rear end portions of said inner flaps comprise a locking portion and a split portion, front end portions of said locking portions elastically protruding inwardly of said case while being directed towards said rear wall.

5. The magnetic tape cassette case of claim 4, wherein said split portions have an outwardly curved edge.

6. The magnetic tape cassette case of claim 4, wherein said locking portions are rectangular.

7. The magnetic tape cassette case of claim 4, wherein said locking portions have an outwardly curved edge.

8. The magnetic tape cassette case of claim 1, wherein said case is made of a thermoplastic resin selected from the group consisting of polyester, polyethylene, polypropylene, polycarbonate, and polyvinyl chloride.

* * * * *